Oct. 14, 1930.  G. S. SMITH  1,778,232
NUT MACHINE
Filed June 4, 1926   7 Sheets-Sheet 1
FIG.1.
FIG.2.
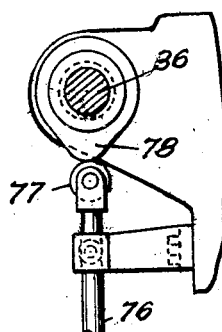
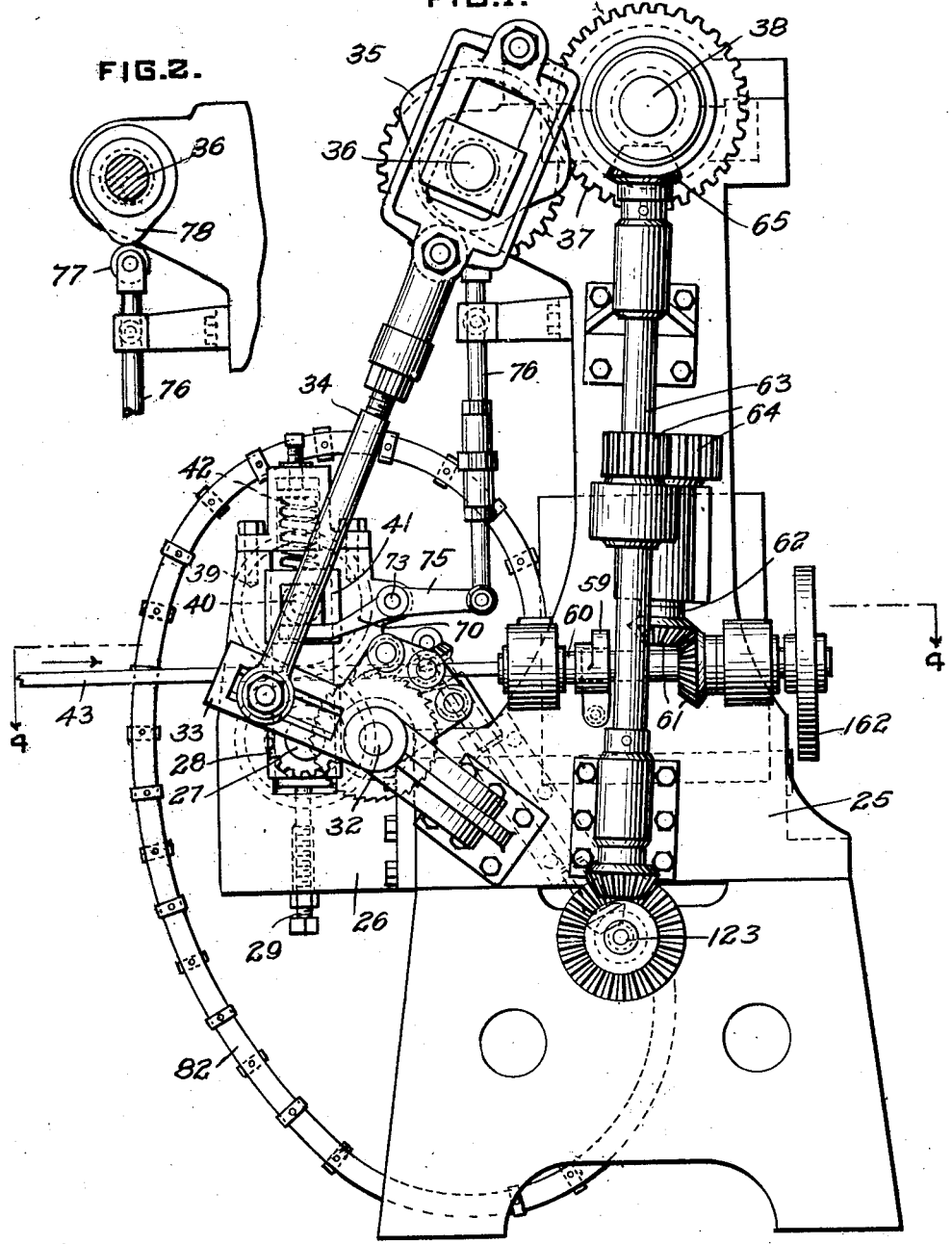
WITNESS
J. Herbert Bradley.
INVENTOR
George S. Smith
By Green and McCallister
His Attorneys Oct. 14, 1930.　　　G. S. SMITH　　　1,778,232
NUT MACHINE
Filed June 4, 1926　　7 Sheets-Sheet 3

WITNESS
J. Herbert Bradley.

INVENTOR
George S. Smith
By Green & McAllister
His Attorneys

Oct. 14, 1930.　　　G. S. SMITH　　　1,778,232
NUT MACHINE
Filed June 4, 1926　　　7 Sheets-Sheet 4

WITNESS
J. Herbert Bradley

INVENTOR
George S. Smith
By Green & McCallister
His Attorneys

Oct. 14, 1930.  G. S. SMITH  1,778,232
NUT MACHINE
Filed June 4, 1926  7 Sheets-Sheet 5

Oct. 14, 1930.    G. S. SMITH    1,778,232
NUT MACHINE
Filed June 4, 1926    7 Sheets-Sheet 6

Oct. 14, 1930.   G. S. SMITH   1,778,232
NUT MACHINE
Filed June 4, 1926    7 Sheets-Sheet 7

WITNESS
J. Habal Bradley.

INVENTOR
George S. Smith
By Green & McCallister
His Attorneys

Patented Oct. 14, 1930

1,778,232

UNITED STATES PATENT OFFICE

GEORGE S. SMITH, OF PITTSBURGH, PENNSYLVANIA, ASSIGNOR, BY MESNE ASSIGNMENTS, TO PITTSBURGH SCREW AND BOLT CORPORATION, A CORPORATION OF PENNSYLVANIA

NUT MACHINE

Application filed June 4, 1926. Serial No. 113,663.

This invention relates to metal working and more particularly to nut making machines adapted to manufacture nut blanks from more or less continuous stock such, for example, as a bar, rod or the like.

An object of this invention is to provide a machine of the type described having an improved construction and a more efficient operation than similar machines now in use and known to me.

A further object is to provide a machine of the character described of such construction and arrangement that an improved product will be obtained by its use.

A still further object is to provide a machine which is rugged in construction, easy and reliable in operation and simple to manufacture and assemble.

Figure 3:
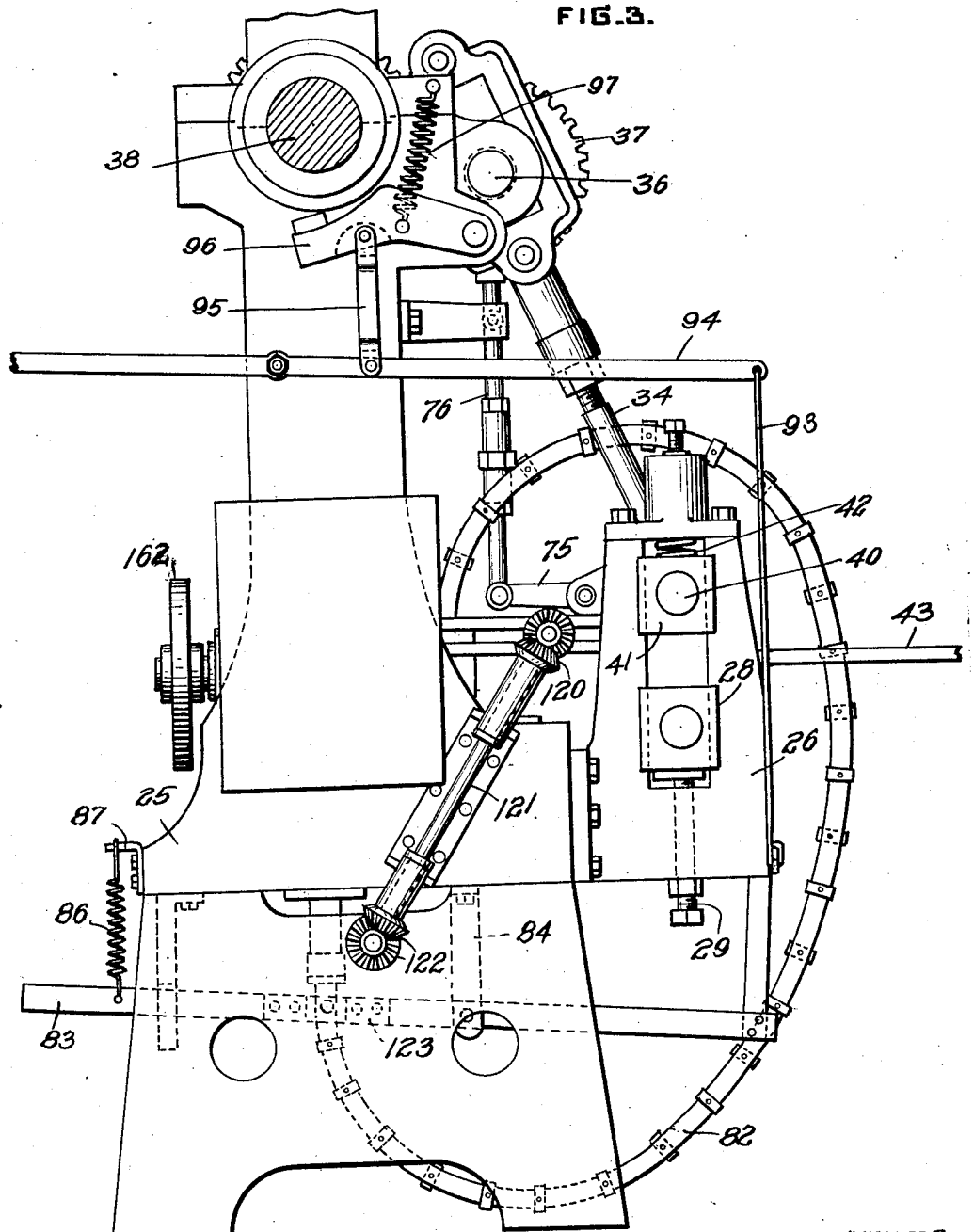
Figure 4:
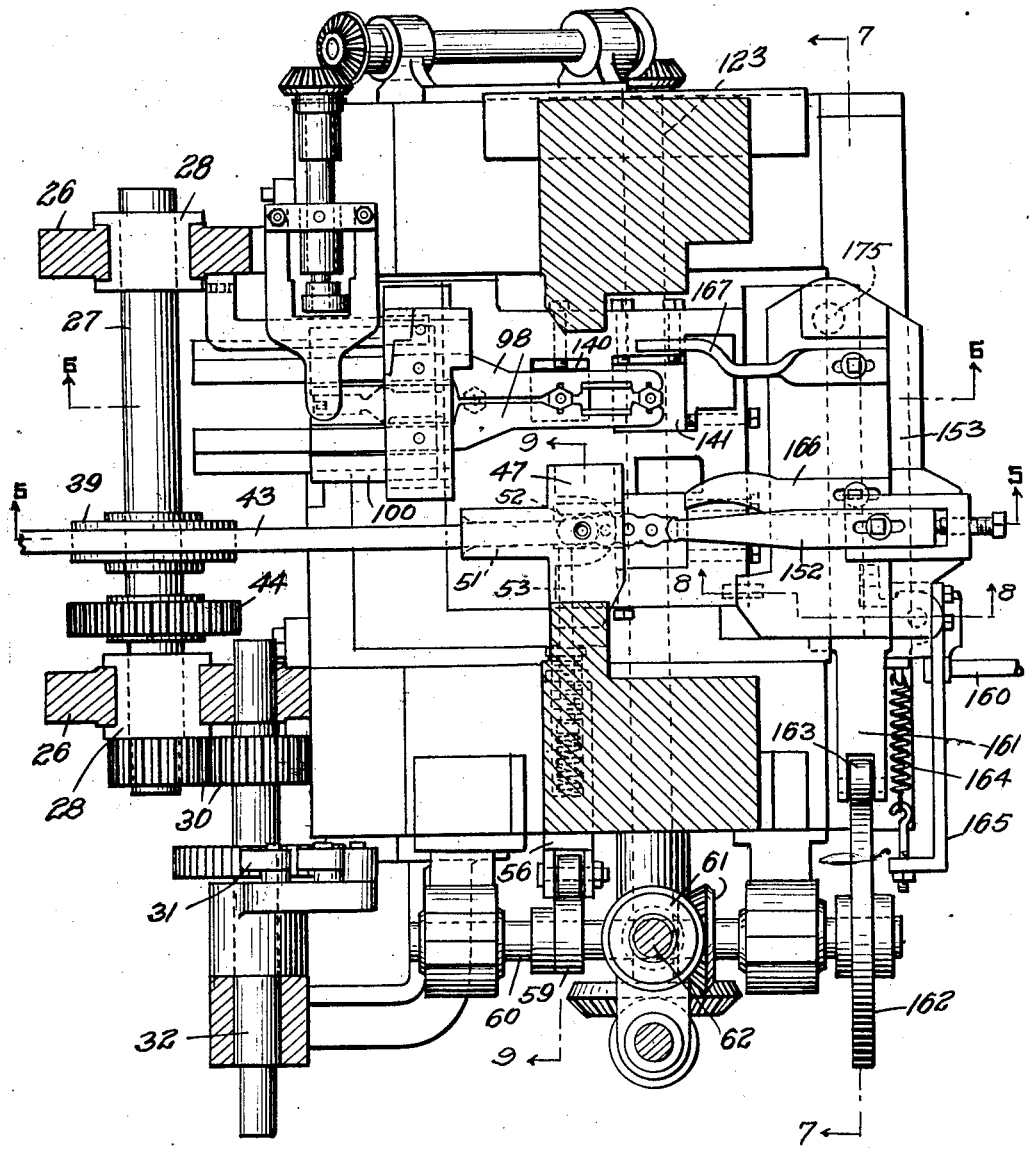
Figure 5:
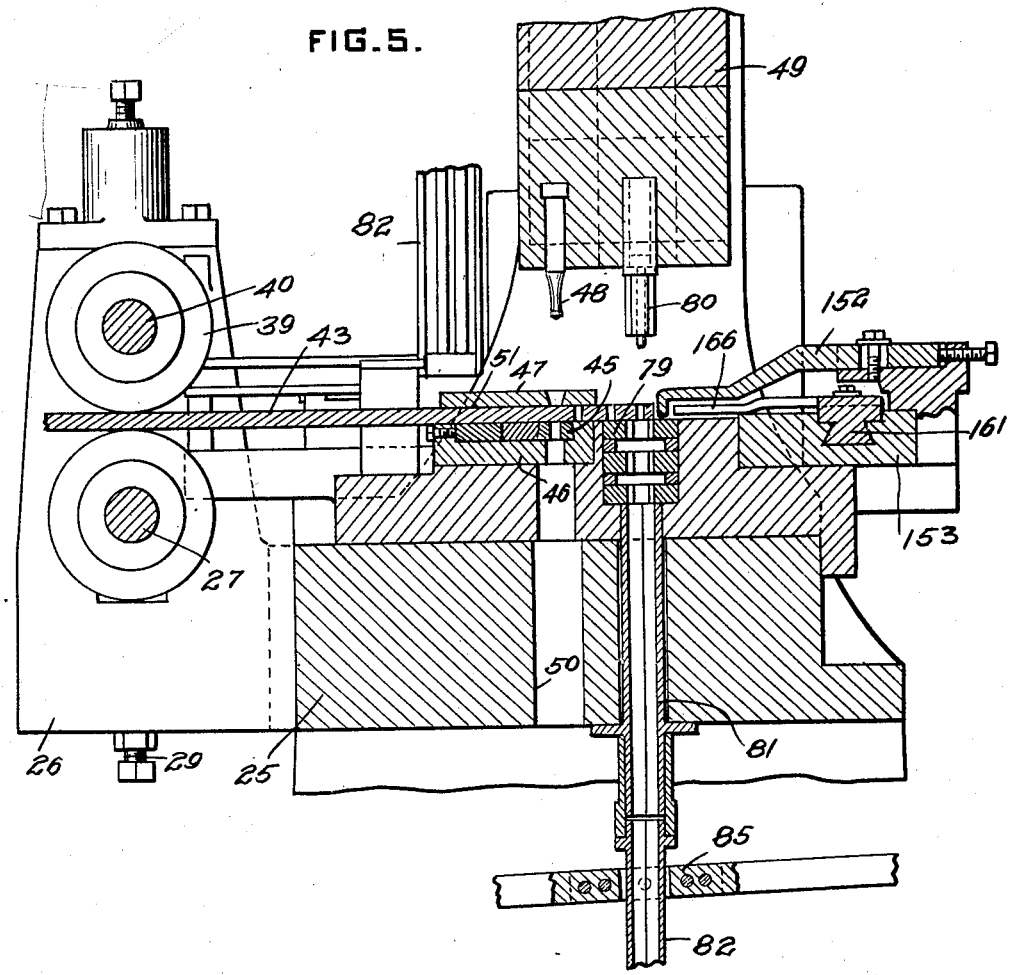
Figure 8:
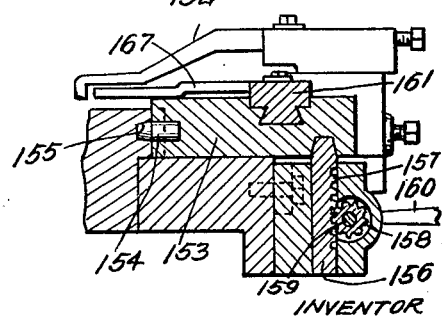
Figure 5:
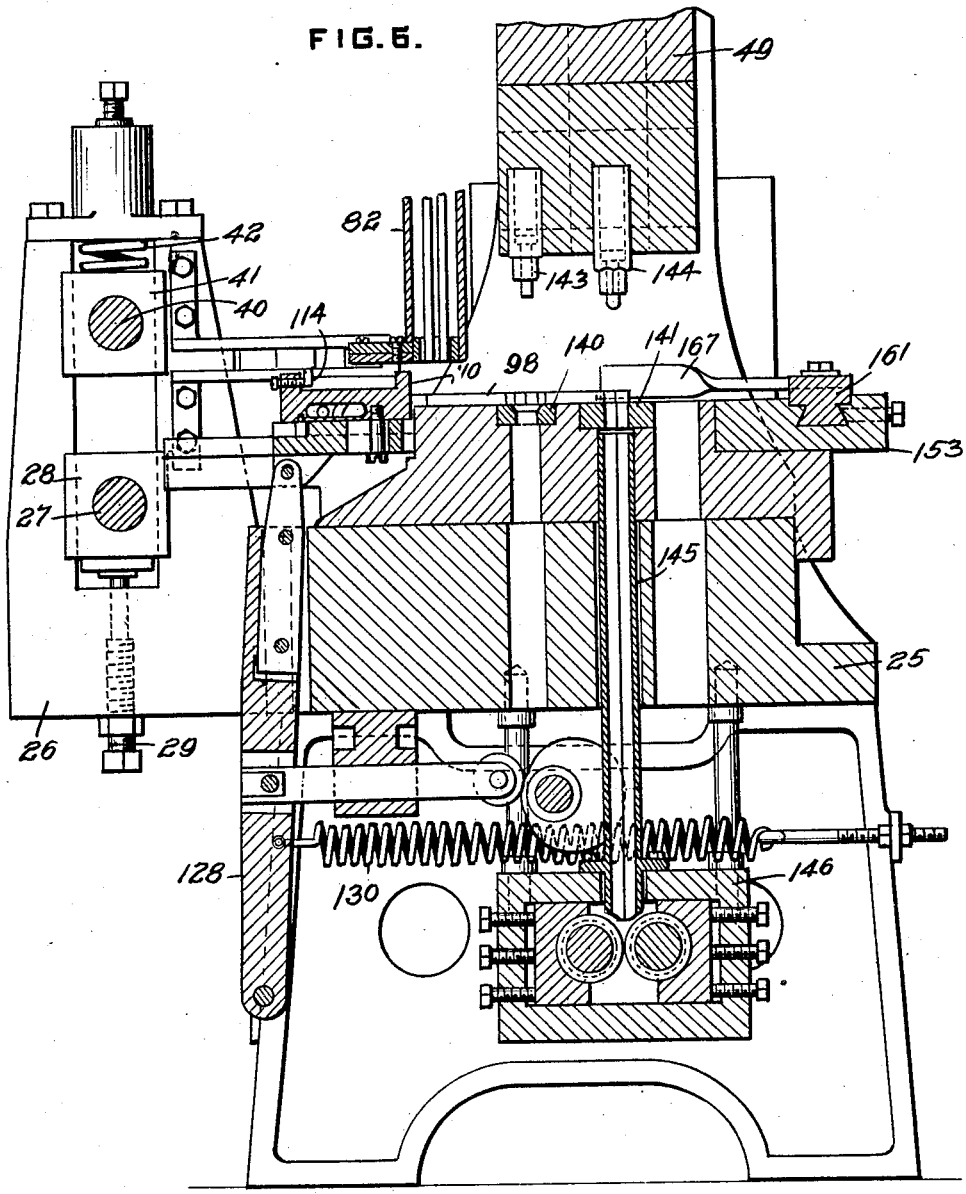
Figure 7:
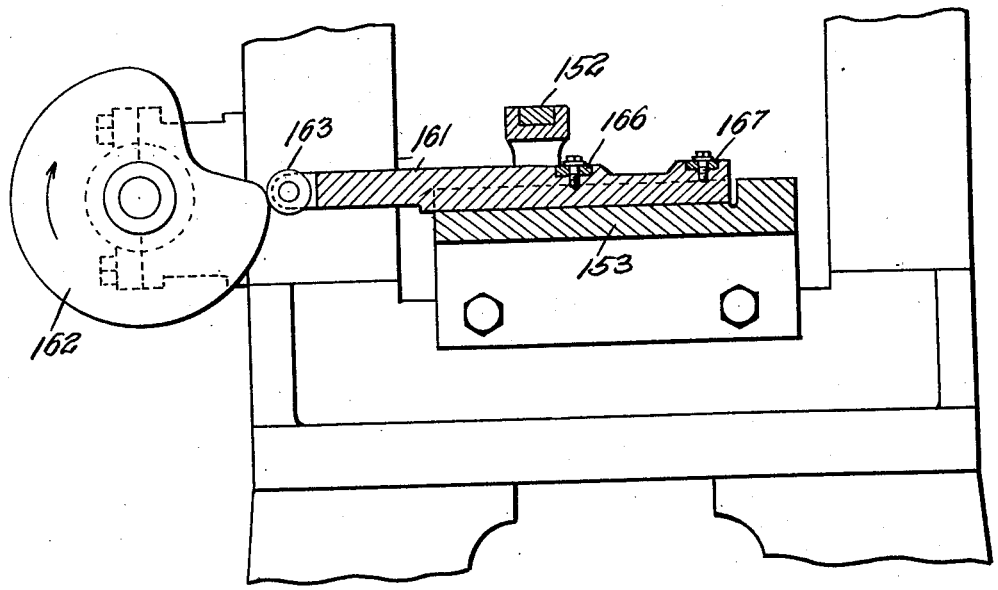
Figure 9:
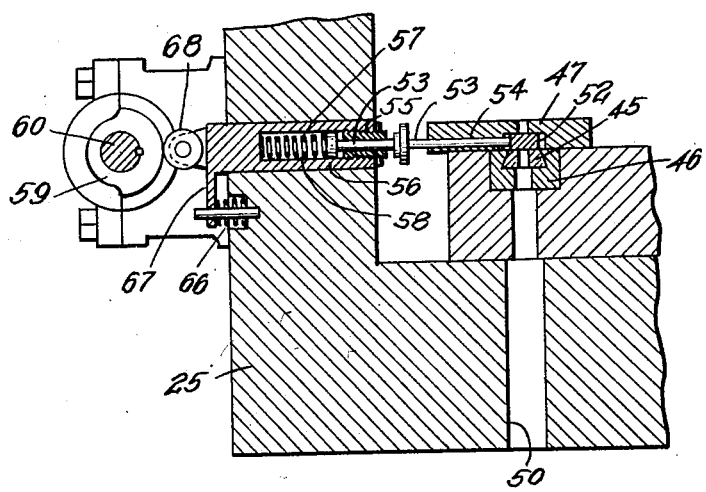
Figure 10:
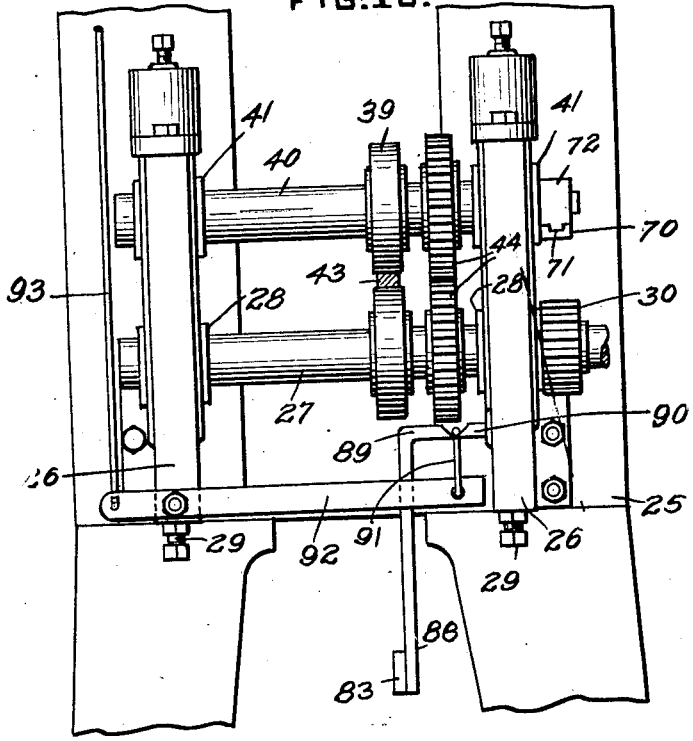
Figure 11:
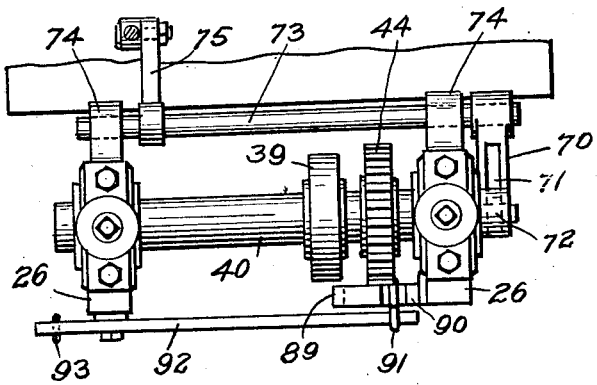

These and other objects which will be apparent to those skilled in this particular art are attained by the invention illustrated in the accompanying drawings, in which Figure 1 is a side elevation of a nut making machine embodying certain preferred arrangements illustrative of the present invention. Fig. 2 is a detail thereof. Fig. 3 is a view similar to Fig. 1 taken from the opposite side of the machine. Fig. 4 is a horizontal sectional view on the line 4—4 of Fig. 1. Figs. 5 and 6 are transverse sections on the lines 5—5 and 6—6, respectively, of Fig. 4. Fig. 7 is a partial section on the line 7—7 of Fig. 4. Fig. 8 is a sectional view on the line 8—8 of Fig. 4. Fig. 9 is a view taken on the line 9—9 of Fig. 4. Fig. 10 is a view in elevation of the feed rolls showing a portion of the automatic stop mechanism and Fig. 11 is a plan view thereof.

The particular embodiment of this invention which has been chosen for the purposes of illustration is shown applied to that type of nut making machine wherein a reciprocating plunger head is provided with piercing and cutting punches which cooperate with associated dies to form rough nut blanks from a continuous rod, bar or the like intermittently fed into the machine by an associated feeding mechanism forming a part thereof. Provision is made for disengaging the feeding mechanism from the stock bar at the time the piercing punch enters the bar so as to permit the expansion of the stock bar, caused by the piercing thereof, to be free and unhindered. The perforated end of the stock bar is cut off at the cutting or blanking die and conveyed by a suitable mechanism to a position permitting it to be fed to a crowning die from which it is transferred to one or more finishing dies, at least one of which is of an improved construction adapted to provide a more highly finished product than has hitherto believed to have been possible.

The machine 25 has suitable feed roll brackets or housings 26 in which a lower feed roll shaft 27 having a lower feed roll 27' thereon, is movably mounted in vertically movable bearings 28 adjustably supported on adjusting screws 29. Gears 30 connect the lower feed roll shaft with an intermittent feeding device such, for example, as a pawl and ratchet mechanism 31 mounted upon a supporting shaft 32 connected to one of the gears 30. The feeding device is so operated that the lower feed roll shaft 27 is turned intermittently by an oscillating arm 33 connected to an adjustable operating rod 34 adapted to be reciprocated by an associated cam 35 mounted on a shaft 36 connected by gears 37 to the power shaft 38 of the machine, as is well known in this particular art.

The upper feed roll 39 is mounted upon an upper feed roll shaft 40 supported in vertically movable bearings 41 in the feed roll housings and the latter are spring pressed downwardly by associated springs 42 so as to cause the feed rolls 27' and 39 to normally engage the stock bar 43 with a driving pressure. The upper and lower feed roll shafts are geared together by suitable gearing 44 so that both are simultaneously rotated by the intermittent feed operating mechanism.

The stock is intermittently fed into the machine above a piercing die 45, see Figs. 4, 5 and 9, located in a die block 46 beneath a stripper plate 47 in associated relation with a piercing punch 48 mounted in a reciprocating plunger head 49. The punching die is positioned above a channel 50 formed in the machine bed through which the punched slugs fall out of the machine. The stripper plate is provided with a channel 51, see Figs. 4 and 5, through which the stock bar is fed and this channel has a laterally widened portion 52, see Figs. 4 and 9, adjacent the punching die to permit free lateral expansion of the stock as a result of the punching thereof. During the punching operation the stock bar is clamped in proper position by a yielding clamping mechanism which preferably includes a reciprocating clamping finger 53, see Figs. 4 and 9, extending through an opening 54 in the stripper plate and having its opposite end extending through a hollow plug 55 secured in the open end of a supporting member 56 slidably mounted in the machine frame. The portions of the clamping finger is pressed toward the stock bar by a spring 57 positioned between the end of the clamping finger and the bottom of a finger receiving bore 58 in the supporting member. The clamping mechanism is intermittently operated by a cam 59 secured to a cam shaft 60 connected by gearing 61 to a stub shaft 62 driven from a counter-shaft 63 by spur gears 64, the counter-shaft being connected to the power shaft 38 by gearing 65. A coil spring 66 is positioned between the machine frame and an arm 67 of the clamping finger operating member 56 so as to maintain a cam follower 68 in engagement with the operating cam 60. It will be apparent that this type of mechanism provides a yielding clamp for properly positioning the stock bar during punching. The rotation of the operating cam 59 is so timed with relation to the feednig mechanism that the clamping finger is disengaged from the stock bar during feeding thereof.

In order to permit the stock bar to expand freely in a longitudinal direction as a result of the punching thereof, mechanism is provided for relieving the stock of engagement with the feed mechanism and this may be conveniently accomplished by providing mechanism for lifting the upper feed roll out of feeding engagement with the stock at the time the punch enters. As illustrated, this is accomplished by a pressure relieving rocker arm 70, see Figs. 1, 3, 10 and 11, having a tongue and groove connection 71 with a box 72 or the like loosely mounted on the adjacent projecting end of the upper feed roll shaft 40. The rocker arm is secured to a rocker shaft 73 rotatably mounted in bearings 74 secured to the feed roll housing 26 and the rocker shaft is suitably operated by a crank arm 75 associated with a connecting rod 76 having a roller 77 held in engagement with an operating cam 78 on the feed operating shaft 36 by the weight of the upper feed roll shaft 40. It will be apparent that depression of the rod 76 by the operating cam will raise the rocker arm 70 so as to lift the upper feed roll 39 out of feeding engagement with the stock against the pressure of the cooperating spring 42 in the housing and this operation is so timed as to take place when the punch enters the stock. It is apparent that the above described mechanism permits the stock bar to more or less float during the punching thereof so that the expansion of the bar resulting from the punching operation can take place freely in all directions. The tongue and groove connection 71 between the rocker arm and the shaft lifting box 72 serves to hold the box in place on the end of the shaft. Obviously, other mechanism than that described can be used.

The punched end of the stock is then fed into position over suitable cutting or blanking dies 79 which may be of any desired form where a rough blank is formed by the descent of a cutting punch 80. From the cutting dies the blank passes downwardly through a feed tube 81, see Figs. 3, 5, to a transfer chute 82, the associated end of which is yieldingly held in operative relation to the end of the chute 81 by a transfer chute supporting lever 83 pivoted to a bracket 84 extending downwardly from the machine frame at one side of the transfer chute. The lever is provided with a chute supporting yoke 85 and its opposite end is secured to a spring 86 extending upwardly to a bracket 87 for the purpose of resiliently holding the transfer chute in operative relation to the feed tube 81 so that if the nut blanks should jam in the chute and be unable to pass therethrough the forcing of additional blanks through the tube 81 by the descent of the cutting punch 80 will merely cause the transfer chute to yield and no breakage of parts will result. Advantage is taken of such yielding of the transfer chute upon the jamming of nuts therein to automatically stop further operation of the machine. This is preferably accomplished by extending the chute supporting lever 83 beyond the bracket 84 and mounting an upwardly extending arm 88 (see Fig. 10) upon this end of the chute supporting lever. The arm is provided with a horizontally extending finger 89 adapted to be positioned in engagement with a cooperating finger 90 mounted on the adjacent feed roll housing 26 when the chute supporting lever 83 is in such position as to hold the transfer chute in operative engagement with the end of the feed tube 81. The ends of the cooperating fingers 89 and 90 are beveled so as to form a notch when in engagement for the purpose of receiving a wire loop 91, (see Fig. 10) hooks or the like extending upwardly from a lever 92 pivoted to the opposite feed roll housing 26 and connected by a connecting link or wire 93 (see Fig. 3) with the clutch operating lever 94 pivoted to the machine frame and in turn connected by a link 95 to a key drawer 96 for operating an associated clutch mechanism on the power shaft 38 of the machine. A spring 97, see Fig. 3, tends to move the key drawer 96 into clutch releasing position, as is well known in this particular art, while the key drawer is held in clutch engaging position by the wire loop 91 being supported in the notch formed between the cooperating levers 89 and 90. It will be apparent that when the transfer chute is in operative engagement with the feed tube 81 the finger 89 will be so positioned, see Fig. 10, that the loop or hook 91 will be held in the notch between the fingers and that the key drawer 96 will be locked in clutch engaging position against the tension of the associated spring 97 by means of the mechanism connecting the levers 92 and 94. However, should the nut blanks jam in the transfer chute so that they are unable to pass therethrough under the impulse of the descending cutting punch 80, the spring 86 will permit the transfer chute to yield. This causes the extended end of the chute supporting lever 83 to be elevated and moves the finger 89 out of cooperative relation with the finger 90. The clutch locking hook 91 is thus released and the key drawer spring 97 causes disengagement of the clutch and stops further operation of the machine.

The transfer chute conveys the rough blanks to a position where they will be engaged by transfer fingers 98 (see Figs. 4 and 6) for conveyance to the finishing dies. Transfer fingers 98 may be provided with a suitable slide mechanism driven by a shaft 121, and timed through a lever and cam mechanism 128 to operate with a finger opening and closing mechanism, such as disclosed in my supplemental application No. 246,590. But, any suitable form of finger and slide mechanism may be employed.

The plunger head 49 is provided with a punch 143 (see Fig. 6) cooperating with the chamfering die to crown the nuts, and a finishing punch 144 for forcing the blanks through a finishing die 141. To provide a product having a more perfect finished surface, the blanks, after passing through the die 141 may be carried to a roller die such as 146 by way of a tube 145.

A stop gauge 152 for accurately limiting the inward feed of the stock bar 43 is adjustably mounted in a supporting block 153 which is pivotally mounted in one end on the machine frame for swinging movement about a pin 175. The horizontal swinging block 153 is provided with a dowel 154 (see Fig. 8) adapted to enter a recess 155 in the machine frame for accurately positioning and locking the block against displacement vertically of the frame. A sliding dowel 156 having a rack surface 157 is mounted for vertical movement within the machine frame below the swinging block 153. A spur gear 158 mounted on a shaft 159 is adapted to be rotated by a handle 160 so as to lock the swinging block 153 in place upon the machine against displacement horizontally. By depressing the dowel 157 the block 153 can be swung outwardly and access to the dies may be had without further dismantling. An ejector slide 161 is reciprocably mounted in the swinging block and extends outwardly to a position where a cam 162 engages a cam roller 163 mounted in the end of the ejector slide (see Fig. 4). A slide return spring 164 secured at one end to the ejector slide and at the other end to a bracket arm 165 secured to the machine holds the cam roller in engagement with the cam surface. The ejector operating cam is mounted upon the cam shaft 60. The cam slide is provided with an ejector finger 166 for cleaning the scrap away from the vicinity of the cutting die and a second scrap ejector or cleaner 167 is mounted upon the slide for cleaning the scrap from the finishing die 141.

It is thought that the operation of the illustrated machine will be apparent without any detailed description. The stock is intermittently fed into the machine by the feeding mechanism described. Just as the piercing punch 48 descends through the stripper plate, and as it is about to enter the stock, the cam 78 depresses the connecting rod 76 so as to raise the rocker arm 70 and relieve the stock of the pressure of the feed rolls. The yieldable clamping finger 53 clamps the stock against the opposite side of the channel 51 in the stripper plate. This permits the stock to more or less float during the punching action so that it is free to expand as a result of the punching in all directions, the widened slot 52 in the stripper plate permitting free lateral expansion thereof. Simultaneously therewith the cutting punch descends and cuts a blank from the end of the bar adjacent the stock gauge 152. Such action forces the previously cut blanks through the transfer chute 82 and delivers a blank to the transfer fingers 98. The latter may be shifted so as to carry the blank over the chamfering die, 140 and a previously chamfered blank to the finishing die 141. The next descent of the plunger head 49 causes the chamfering punch 143 to force an associated blank into the chamfering die where it is crowned while the finishing punch 144 forces a blank through the die 141. The descent of the finishing punch forces the blanks which have collected in the tube 145 downwardly so that the lowest blank therein is driven through the roller die 146 and out of the machine.

If any jamming of the nuts takes place in the transfer chute 82, the descent of the cutting punch 80 and the resulting pressure of the nuts in the chute causes the latter to be forced downwardly against the tension of the chute supporting spring 86. This results, as above described, in an upward movement of the locking finger 89 so as to free the hook or loop 91 and permit the clutch releasing spring 97 to move the key drawer 96 into clutch releasing position so as to stop further operation of the machine.

Although I have described a machine embodying specific features of this invention it will be apparent that various changes, additions, substitutions and omissions can be made therein without departing from the spirit of this invention or the scope of the appended claims.

What I claim as new and desire to secure by Letters Patent is:

1. The combination in a nut making machine of a pair of feed rolls adapted to intermittently feed a bar of stock thereto, means for relieving said stock of the pressure of said rolls between feeding movements and means pressing yieldingly on a side of said bar of stock to permit lateral expansion of the stock being punched.

2. The combination in a nut making machine of a cutting die, a finishing die, a yielding transfer chute adapted to be shifted upon jamming of said blanks therein and a stop mechanism operated by movement of said chute for stopping said machine.

3. The combination in a nut making machine of a cutting die, a transfer chute for conveying blanks from said cutting die, means for yieldingly supporting said chute in operative relation to said die whereby jamming of said blanks in said chute will cause said chute to yield and means operated by yielding of said chute for stopping the machine.

4. The combination in a nut making machine of a cutting die, a punch cooperating therewith to form nut blanks, a transfer chute associated with said die for conveying blanks therefrom, a shaft for operating said punch, a clutch through which said shaft is driven, means for normally locking said clutch in engaging position and means for yieldingly supporting said chute so as to permit said chute to yield upon jamming of said blanks therein and means operated by yielding of said chute to release said lock to permit disengagement of said clutch.

5. The combination in a nut making machine of a cutting die, a punch cooperating therewith to form nut blanks, a punch operating shaft provided with a clutch through which said shaft is driven, means for releasing said clutch, a transfer chute associated with said die for conveying blanks therefrom, a yieldingly supported lever for normally maintaining said chute in operative position, means on said lever for locking said clutch release against operation, said means being so formed as to permit operation of said clutch release upon shifting of said chute caused by jamming of said blanks therein.

6. The combination in a nut making machine of a cutting die, a punch cooperating therewith to form nut blanks, a punch operating shaft provided with a clutch through which said shaft is driven, a spring pressed key drawer for releasing said punch, a lever for preventing the operation of said key drawer, a transfer chute, a chute supporting lever adapted to yieldingly hold said chute in operative position but to permit said chute to yield upon jamming of said blanks therein, means associated with said chute supporting lever for locking said clutch release lever in clutch engaging position so formed as to unlock said clutch release lever and permit disengagement of said clutch upon shifting of said chute.

7. The combination in a nut making machine of a punching die, a slotted stripper plate associated with said die, the slot of said plate being of such width adjacent said die so as to permit free lateral expansion of a stock bar, means for feeding stock through said stripper plate under said die, a piercing punch adapted to cooperate with said die to pierce said stock and a yieldable clamping finger for positioning said stock under said die.

8. The combination in a nut making machine of a punching die, a cutting punch cooperating therewith, a slotted stripper plate associated with said die, the slot therein being of such width above said die so as to permit free lateral expansion of the stock during punching, means for intermittently feeding stock over said die, means for clamping said stock during punching and means for relieving said stock of the pressure of said feeding means so as to permit free longitudinal expansion thereof during punching.

9. The combination in a nut making machine of means for clamping a bar of stock during the operation of punching said stock, including a reciprocating finger and means for reciprocating said finger in timed relation to the punching operation of said machine and for yieldingly pressing said finger into clamping engagement with the side of said stock during punching thereof.

10. The combination in a nut making machine of blank forming dies, a pivoted block mounted on said machine adjacent to said dies and adapted to be swung outwardly to give access to said dies and a stock gauge mounted on said block.

11. The combination in a nut making machine of a cutting die, a finishing die, a swinging block pivoted on said machine and adapted to be swung outwardly to give access to said dies, an ejector slide on said block provided with means for cleaning scrap from said dies and means for reciprocating said slide.

12. The combination in a nut making machine of a cutting die, a finishing die, means for transferring blanks from said cutting die to said finishing die, a swing block pivoted to said machine and adapted to be swung outwardly so as to give access to said dies, a dowel for locking said block against vertical displacement when in closed position, a vertically movable dowel for locking said block in closed position, a stock gauge supported on said block, an ejector slide reciprocably mounted therein and provided with fingers adapted to clean the scrap from said dies and means for reciprocating said slide.

13. The combination in a nut making machine of a cutting die, a finishing die, an extensible transfer chute for conveying blanks from said cutting die to said finishing die, said chute being disposed to be extended in response to jamming of nut blanks therein, operating mechanism for the machine, including a clutch and mechanism operable in response to extension of said chute for disconnecting said clutch.

14. The combination in a nut making machine having dies, of a yielding transfer chute adapted to be shifted upon jamming of blanks therein, a clutch, an operating shaft driven by said clutch, means for locking said clutch against release, and a mechanism operated by the shifting of said chute for unlocking said clutch and stopping said machine.

15. The combination in a nut making machine of a punching die, a cutting punch cooperating therewith, a slotted stripper plate associated with said die, the slot therein having a width above said die sufficient to permit free lateral expansion of the stock during punching, means for intermittently feeding stock over said die, a yieldable clamping finger for positioning said stock during punching, and means for relieving the stock of the pressure of said feeding means for permitting free longitudinal expansion thereof during punching.

16. The combination in a nut making machine of blank forming dies, a die enclosing block, an ejector slide reciprocably mounted on said block and provided with means for cleaning scrap from said dies.

In testimony whereof, I have hereunto subscribed my name this 14th day of May, 1926.

GEORGE S. SMITH.